US008596974B2

(12) United States Patent
Matalanis et al.

(10) Patent No.: US 8,596,974 B2
(45) Date of Patent: Dec. 3, 2013

(54) ACTIVE ROTOR BLADE CONTROL EFFECTOR SYSTEM FOR A ROTARY-WING AIRCRAFT

(75) Inventors: Claude G. Matalanis, Longmeadow, MA (US); Brian E. Wake, South Glastonbury, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 476 days.

(21) Appl. No.: 12/910,554

(22) Filed: Oct. 22, 2010

(65) Prior Publication Data
US 2011/0164976 A1 Jul. 7, 2011

Related U.S. Application Data

(60) Provisional application No. 61/254,319, filed on Oct. 23, 2009.

(51) Int. Cl.
*B64C 11/00* (2006.01)
(52) U.S. Cl.
USPC .................................. 416/1; 416/23
(58) Field of Classification Search
USPC .......... 416/23, 24, 98, 147, 500, 240, DIG. 5, 416/1; 244/213, 215, 219
See application file for complete search history.

(56) References Cited

U.S. PATENT DOCUMENTS

| 5,711,651 | A | 1/1998 | Charles et al. |
| 6,478,541 | B1 | 11/2002 | Charles et al. |
| 7,028,954 | B2 | 4/2006 | Van Dam et al. |
| 2003/0218102 | A1* | 11/2003 | Van Dam et al. ............. 244/215 |
| 2006/0083617 | A1* | 4/2006 | Jolly et al. .................... 416/133 |
| 2007/0221789 | A1 | 9/2007 | Lee et al. |

FOREIGN PATENT DOCUMENTS

WO 2008051293 A2 5/2008

OTHER PUBLICATIONS

Extended European Search Report for corresponding EP Application No. 1018877.6-2422, dated Sep. 29, 2011, pp. 1-6.
European Office Action for EP Application No. 10188777.6-2422, dated Nov. 27, 2012, pp. 1-5.

* cited by examiner

*Primary Examiner* — Edward Look
*Assistant Examiner* — Juan G Flores
(74) *Attorney, Agent, or Firm* — Cantor Colburn LLP

(57) ABSTRACT

A helicopter includes an airframe, and a rotor system mounted to the airframe. The rotor system includes a plurality of rotor blades. Each of the plurality of rotor blades includes a root portion that extends to a tip portion through an airfoil portion. The airfoil portion includes first and second surfaces. An effector is mounted within the airfoil portion of at least one of the plurality of rotor blades. The effector includes a first end portion that extends to a second end portion through an intermediate portion, and a flap arranged at the second end portion. The effector is selectively actuated to shift from a first, stowed, position wherein the flap is positioned within the at least one rotor blade to a second, deployed, position, wherein flap projects through at least one of the first and second surfaces of the at least one rotor blade.

16 Claims, 3 Drawing Sheets

ACTIVE ROTOR BLADE CONTROL EFFECTOR SYSTEM FOR A ROTARY-WING AIRCRAFT

CROSS REFERENCE TO RELATED APPLICATION

The present invention claims benefit to U.S. Provisional Patent Application entitled "Aerodynamic Evaluation of Miniature Trailing-Edge Effectors for Active Rotor Control" Ser. No. 61/254,319 filed on Oct. 23, 2009 incorporated herein by reference.

BACKGROUND OF THE INVENTION

The subject matter disclosed herein relates to the art of rotary wing aircraft and, more particularly, to an active rotor blade control effector system for a rotary-wing aircraft.

Control of rotary-wing aircraft is affected by rotor blade pitch variations. The rotor blades are controlled individually (cyclic control) and collectively (collective control). Main rotor pitch control is typically achieved through a swashplate assembly that transfers motion of non-rotating control members to rotating control members. The transfer of motion occurs once per blade revolution (1/rev). Transferring cyclic and collective control inputs only once per revolution provides a limited control input envelope for the rotor blade.

In addition to limiting control inputs to 1/rev, conventional rotor blades, in descent flight conditions, generate noise that is commonly referred to as blade-vortex interactions (BVI) noise or blade slap. BVI noise is generated by blade tip vortices that interact with the rotor blades. BVI events are high frequency unsteady airloads (>15/rev) have been identified as one of the more objectionable noises produced by rotary-wing aircraft, particularly during descent conditions. Rotor blades also generate thickness noise based on their shape, loading, and motion. This noise tends to occur in the plane of the rotor disk and occurs within a frequency range that is easily detected electronically at large distances thus increasing vulnerability of military aircraft. Typically, flap motions of 2/rev-3/rev have been shown to be effective for noise reduction. Additionally, specialized waveforms can potentially reduce thickness noise through pressure cancelation. The deployment of the effector for noise reduction can be determined using a closed-loop feedback controller. Finally, vibrations generated by conventional rotor blades translate to 4/rev and 8/rev in the fixed frame, these contribute heavily to pilot fatigue and mechanical wear. Reduction of vibration level required harmonic control primarily at the frequencies of $(n-1)$/rev, $n$/rev, and $n+1$/rev, where n is the number of blades.

In order to minimize noise and vibration, certain rotor blade systems employ trailing-edge flaps that are deployed during descent flight conditions. Existing trailing-edge flaps designed for this purpose are typically more than 10% of blade chord length in size and are shiftable plus/minus about 0-5 degrees with respect to a freestream direction. The relatively large size of the flaps limits possible actuation speeds and adds significant weight to the rotor blades.

BRIEF DESCRIPTION OF THE INVENTION

According to one aspect of the invention, a helicopter includes an airframe, and a rotor system mounted to the airframe. The rotor system includes a plurality of rotor blades. Each of the plurality of rotor blades includes a root portion that extends to a tip portion through an airfoil portion. The airfoil portion includes first and second surfaces. At least one effector is mounted within the airfoil portion of at least one of the plurality of rotor blades. The at least one effector includes an arm having a first end portion that extends to a second end portion through an intermediate portion, and a flap arranged at the second end portion. The effector is selectively actuated to shift from a first, stowed, position wherein the flap is positioned within the at least one rotor blade to a second, deployed, position, wherein flap projects through at least one of the first and second surfaces of the at least one rotor blade.

According to another aspect of the invention, a method of actively controlling a rotor blade of a rotary-wing aircraft includes deploying at least one flap through a surface of the rotor blade.

According to yet another aspect of the invention, an active rotor blade control effector is mounted within the airfoil portion of a rotor blade. The active rotor blade control effector includes an arm including a first end portion that extends to a second end portion through an intermediate portion, and a flap arranged at the second end portion. The effector is selectively actuated to shift from a first, stowed, position wherein the flap is positioned within the rotor blade to a second, deployed, position, wherein flap projects through at least one of first and second surfaces of the rotor blade.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
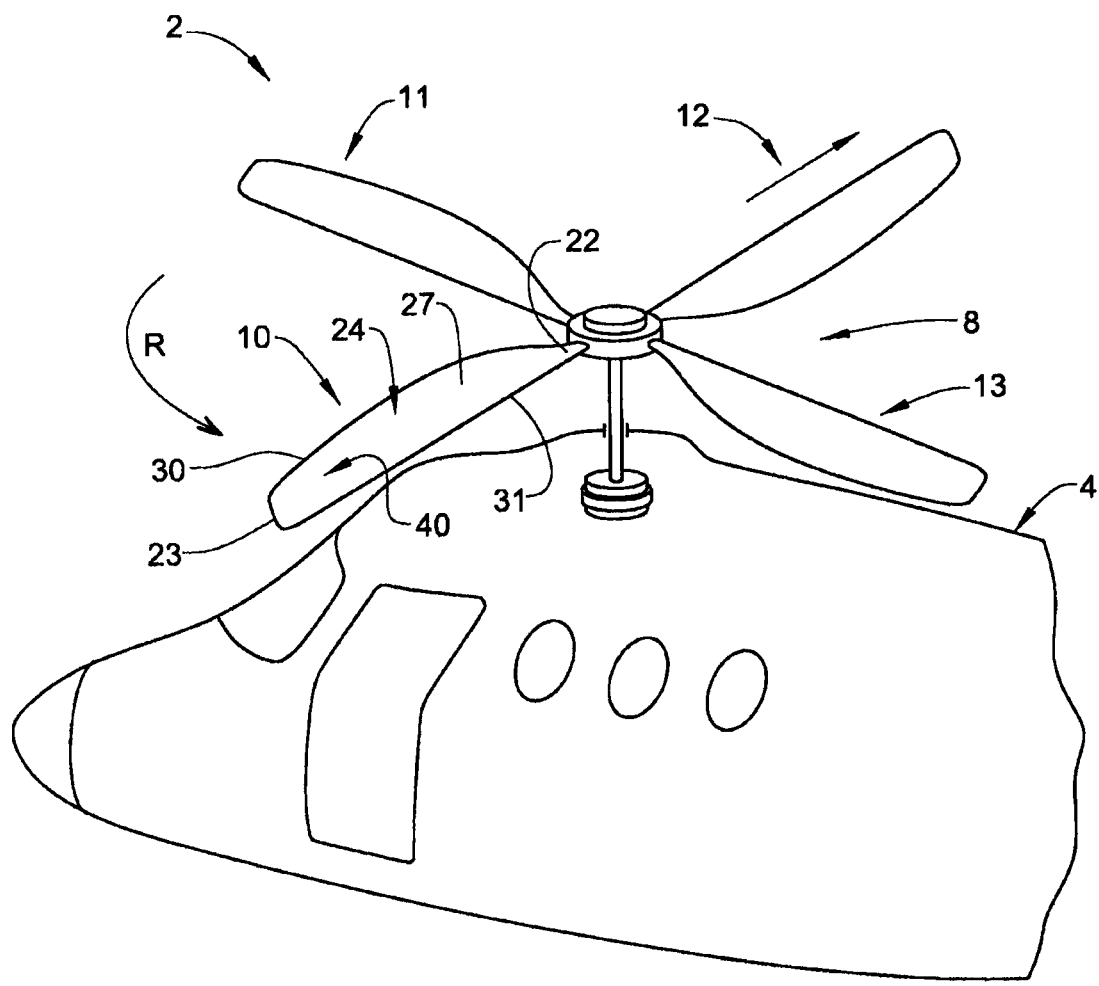
FIG. 1 is a partial perspective view of a helicopter including an active rotor control effector system constructed in accordance with an exemplary embodiment.
Figure 3:
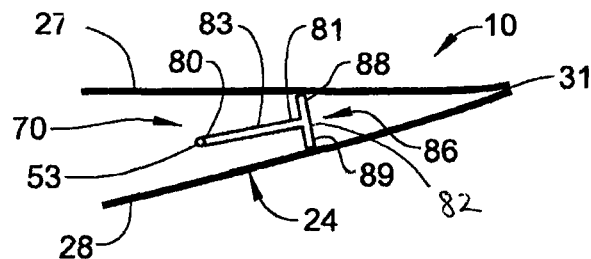
FIG. 3 is side view of the rotor blade of FIG. 2 illustrating the active rotor control effector system in a first or stowed position.

With reference FIG. 1, a rotary-wing aircraft, constructed in accordance with an exemplary embodiment, is indicated generally at 2. Rotary-wing aircraft 2 includes an airframe 4 and a rotor system 8 including a plurality of rotor blades 10-13. As each rotor blade 10-13 is substantially similar, a detailed description will follow referencing rotor blade 10 with an understanding that the remaining rotor blades 11-13 contain similar structure. Rotor blade 10 includes a first or root portion 22 that extends to a second or tip portion 23 through an airfoil portion 24 having first and second opposing surfaces 27 and 28 (FIG. 3). Rotor blade 10 is further shown to include a trailing edge 30 and an opposing, leading edge 31. As will be detailed more fully below, rotor blade 10 includes an active rotor blade control effector system 40 arranged within airfoil portion 24.

In the illustrated embodiment, active rotor blade control effector system 40 is disposed on trailing-edge 30. As used herein, trailing-edge 30 is a portion of the blade 10 that follows or trails the movement of rotor system 8 in the direction indicated by R. The active rotor blade control effector system 40 can be disposed anywhere between about 80% and about 95% of the blade chord length measured from leading-edge 31. Also, while shown adjacent tip portion 23, active rotor blade control effector system 40 can be disposed at any point along airfoil portion 24 between about 60% and about 90% of the rotor radius.

Figure 2:
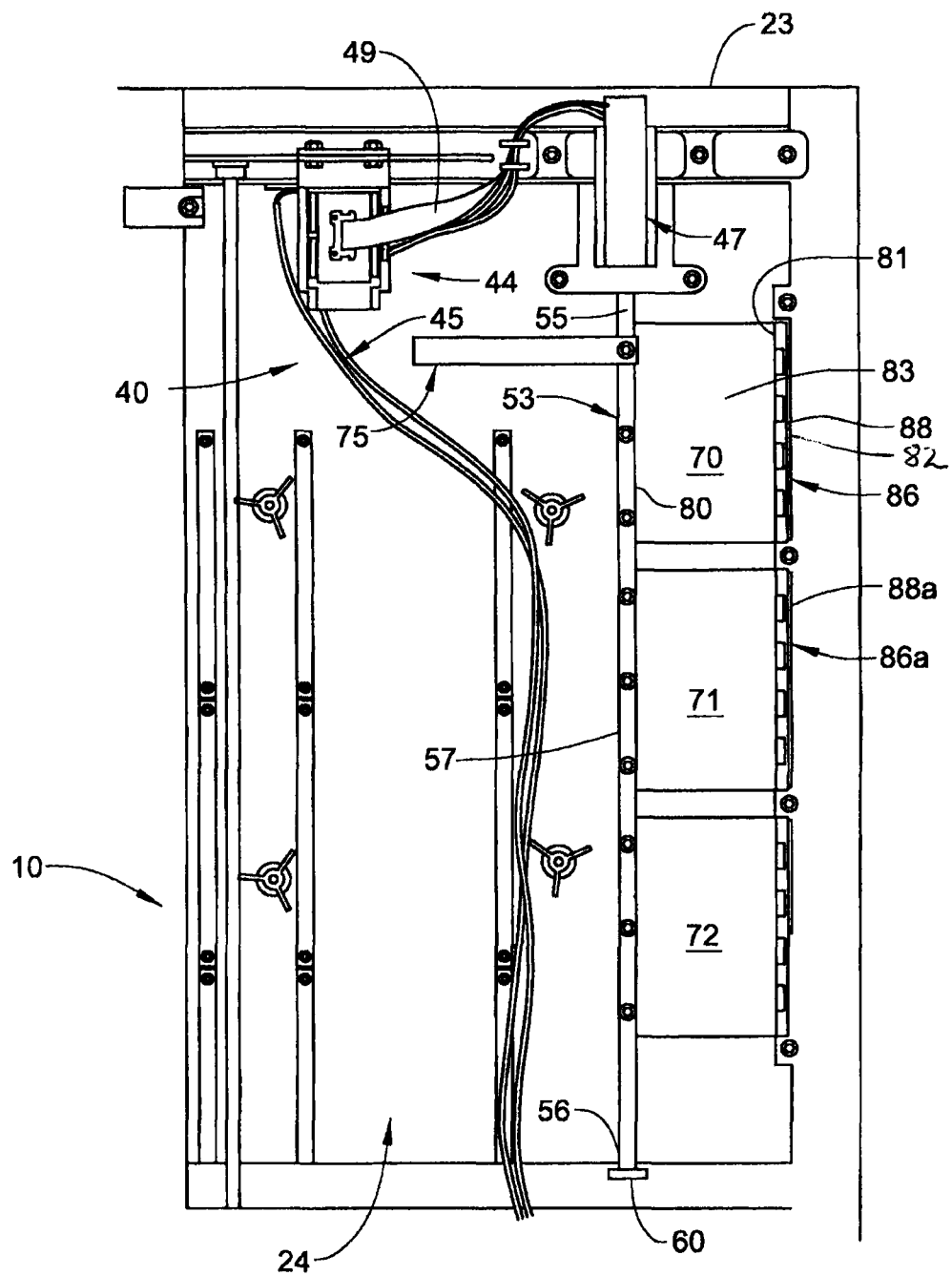
FIG. 2 is plan view of a rotor blade of the helicopter of FIG. 1 illustrating the active rotor control effector system in accordance with an exemplary embodiment.

As best shown in FIG. 2, active rotor blade control effector system 40 includes a controller 44 mounted within airfoil portion 24. Controller 44 is operatively linked to a control system (not shown) arranged within airframe 4 through a wire harness 45. Controller 44 is also operatively linked to an actuator 47 through a wire harness 49. In accordance with one aspect of the exemplary embodiment, actuator 47 may be arranged between about 0.25 and about 0.75 blade chord lengths from leading edge 31. In the exemplary embodiment shown, actuator 47 is an electric motor, however it should be understood that other forms of actuators, such as voice coils, piezoelectrics, and pneumatic actuators may be employed. Actuator 47 is linked to an axle 53. Axle 53 includes a first end 55 that extends to a second end 56 through an intermediate portion 57. First end 55 is operatively coupled to actuator 47 while second end 56 is supported by a bearing 60.

In accordance with the exemplary embodiment shown, active rotor blade control effector system 40 includes a plurality of effectors 70-72 arranged within airfoil portion 24. As will be discussed more fully below, effectors 70-72 are selectively deployed between first and second surfaces 27 and 28 in order to affect flight dynamics of rotor blade 10. At this point it should be understood that each effector 70-72 is substantially similar such that reference will follow to FIGS. 2 and 3 in describing effector 70 with an understanding that effectors 71 and 72 include similar structure. As shown, effector 70 includes a first end portion 80 that extends to a second end portion 82 through an intermediate portion 83. First end portion 80 is coupled to axle 53 while second end portion 82 includes a flap 86. In the exemplary embodiment shown, flap 86 includes a first flap portion 88 and a second flap portion 89. First and second flap portions 88 and 89 extend substantially perpendicular relative to intermediate portion 83. As will be discussed more fully below, effector 70 is selectively shifted from a first or stowed position, such that flap 86 is disposed within rotor blade 10 to a second, deployed position, such that flap 86 extends through rotor blade 10.

Figure 4:
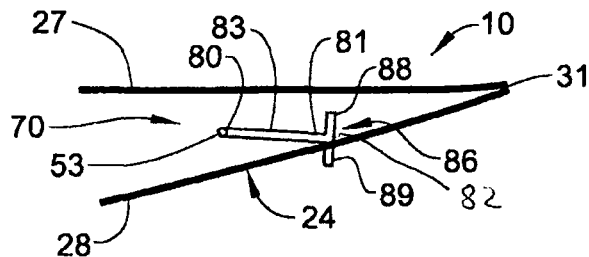
FIG. 4 is side view of the rotor blade of FIG. 3 illustrating the active rotor control effector system in a second or deployed position with a flap extending through a lower surface of the rotor blade.
Figure 5:
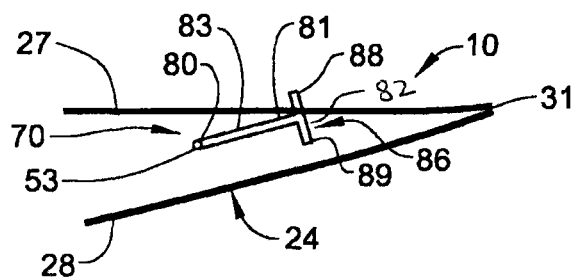
FIG. 5 is side view of the rotor blade of FIG. 3 illustrating the active rotor control effector system in the second or deployed position with the flap extending through an upper surface of the rotor blade.

In further accordance with an exemplary embodiment, controller 44 is configured to activate actuator 47 to rotate effector 70 to a first deployed position. In the first deployed position, second flap portion 89 extends through second surface 28 of rotor blade 10 as shown in FIG. 4. Controller 44 is also configured to activate actuator 47 to rotate effector 70 to a second deployed position. In the second deployed position, first flap portion 89 extends through first surface 27 of rotor blade 10 as shown in FIG. 5. Actuator 47 rotates each effector 70-72 at frequencies between about 2/rev and about 6/rev according to a deployment schedule or in response to measured feedback which minimizes noise and/or vibration. Measured feedback may be from one or more of airframe 4, rotor system 8, or blades 10-13.

Figure 6:
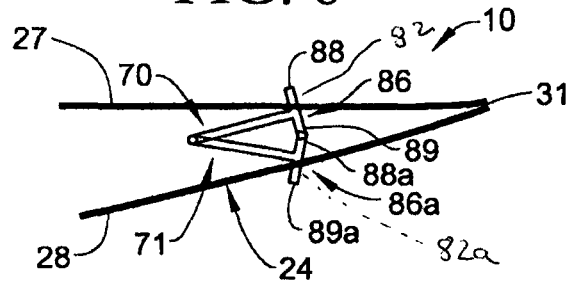
FIG. 6 is side view of the rotor blade of FIG. 3 illustrating the active rotor control effector system in a second or deployed position with a first flap extending through the lower surface of the rotor blade and a second flap extending through the upper surface of the rotor blade.

At this point it should be understood that actuator 47 rotates each effector 70-72 from the stowed position to the first deployed position. Of course, actuator 47 could also be configured to selectively deploy less than all of the effectors on a particular rotor blade. In addition, it should be understood that actuator 47 could rotate effector 70 to the second deployed position and effector 71 having a flap 86a and a second flap portion 89a to the first deployed position. In this configuration, first flap portion 88 extends through first surface 27 and second flap portion 89a extends through second surface 28 such as shown in FIG. 6. Finally, it should be understood that number and location of effectors could vary in accordance with the exemplary embodiment.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A helicopter comprising:
an airframe;
a rotor system mounted to the airframe, the rotor system including a plurality of rotor blades, each of the plurality of rotor blades including a root portion extending to a tip portion through an airfoil portion, the airfoil portion having first and second surfaces; and
at least one effector mounted within the airfoil portion of at least one of the plurality of rotor blades, the at least one effector including a first end portion that extends to a second end portion through an intermediate portion, and a flap arranged at the second end portion, the effector being selectively actuated to pivot about the first end portion to shift the flap from a first, stowed, position wherein the flap is positioned within the at least one rotor blade to a second, deployed, position, wherein flap projects through at least one of the first and second surfaces of the at least one rotor blade.

2. The helicopter according to claim 1, wherein the flap extends substantially perpendicular relative to the intermediate portion.

3. The helicopter according to claim 1, further comprising: an actuator mounted in the airfoil portion of the at least one rotor blade, the actuator being selectively activated to shift the flap through the one of the first and second surfaces of the at least one rotor blade.

4. The helicopter according to claim 3, wherein the actuator is selectively activated to shift the flap through each of the first and second surfaces of the at least one rotor blade.

5. The helicopter according to claim 1, wherein the at least one effector includes a plurality of effectors, each of the plurality of effectors being selectively shiftable between the stowed position and the deployed position.

6. The helicopter according to claim 1, wherein when in the deployed position, a first portion of the flap projects through the first surface of the at least one rotor blade and a second portion of the flap projects through the second surface of the at least one rotor blade.

7. The helicopter according to claim 1, wherein the at least one effector is mounted adjacent the tip portion of the at least one rotor blade.

8. A method of actively controlling a rotor blade of a rotary-wing aircraft, the method comprising:

rotating an effector to deploy at least one flap through a surface of the rotor blade.

9. The method of claim 8, further comprising: selectively deploying the at least one flap through a first surface of the rotor blade and through a second, opposing surface of the rotor blade.

10. The method of claim 8, further comprising: deploying a first flap through a first surface of the rotor blade and a second flap through a second, opposing surface of the rotor blade.

11. The method of claim 8, further comprising: simultaneously deploying the first flap through a first surface of the rotor blade and the second flap through a second, opposing surface of the rotor blade.

12. An active rotor blade control effector mounted within an airfoil portion of a rotor blade, the active rotor blade control effector comprising:

a first end portion that extends to a second end portion through an intermediate portion; and a flap arranged at the second end portion, the effector being selectively actuated to pivot about the first end portion to shift the flap from a first, stowed, position wherein the flap is positioned within the rotor blade to a second, deployed, position, wherein flap projects through at least one of first and surfaces of the rotor blade.

13. The active rotor blade control effector according to claim 12, wherein the flap extends substantially perpendicular relative to the intermediate portion.

14. The active rotor blade control effector according to claim 13, further comprising: an actuator operatively coupled to the first end portion of the effector, the actuator being selectively activated to shift the flap through the one of first and second surfaces of the rotor blade.

15. The active rotor blade control effector according to claim 13, wherein the actuator is selectively activated to shift the flap through each of first and second surfaces of the at least one rotor blade.

16. The active rotor blade control effector according to claim 13, wherein the effector is mounted adjacent a tip portion of the at least one rotor blade.

* * * * *